3,210,176
METHOD OF DESTROYING CHAMOMILE PLANTS

Fredo Günther, Munich, and Gerhard Liedtke, Berlin-Reinickendorf, Germany, assignors to Schering, A.G., Berlin, Germany
No Drawing. Filed May 31, 1962, Ser. No. 198,712
Claims priority, application Germany, June 13, 1961, Sch 29,840
12 Claims. (Cl. 71—2.6)

This invention relates to herbicides and methods of using the same. More particularly it relates to herbicides which nearly selectively destroy chamomile plants of the genera Matricaria and Anthemis.

Wild chamomile plants, *Matricaria chamomilla*, and related plants of the Matricaria and Anthemis genera are common weeds in cereal crops. They are insensitive to otherwise effective weed killers tolerated by cereal crops such as the commonly employed derivatives of phenoxyacetic acid and phenxypropionic acid. Where other weeds are eradicated by the use of herbicides, the chamomile plants thrive. They grow readily on soil compacted by the wheels of heavy farm machinery and by natural causes. Harvesting by machinery tends to spread their seeds with the result that the crop yield of fields infested with chamomile plants may be severely impaired.

Weedkillers effective against chamomile are known. They include such contact herbicides as dinitro-o-cresol or dinitro-sec-butylphenol, and mixtures of MCPA (methylchlorophenoxyacetic acid) and TBA (trichlorobenzoic acid). Contact herbicides are generally inconvenient to use because of their toxicity and their staining properties which endanger the personnel operating the spraying equipment usually employed in applying such herbicides. Mixtures of MCPA and TBA may be used safely only during a limited period in the growth of grain crops since TBA is toxic to the crops and may inhibit their growth and reduce yields even when handled with expert care. Herbicides of the growth promoting type are generally more desirable, but none have heretofore been available against chamomile plants.

It has now been found that certain esters of beta-naphthoxyacetic acid, $C_{10}H_7$—$OCH_2$—$COOH$ are harmless to cereal crops and selectively destroy chamomile plants of the Matricaria and Anthemis genera. The effective herbicides of the invention are of the formula

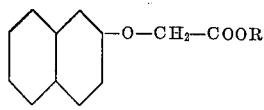

wherein R is an an alkyl radical having one to six carbon atoms or an alkoxyethyl radical, the alkoxy group of which has one to four carbon atoms.

The herbicidal agents of the invention are effective against chamomile plants in amounts in which these growth promoting herbicides have only marginal effects against other weeds. They are adequately destructive of chamomile plants when applied in amounts of one to five kilograms per hectare, three kilograms per hectare, about 2.7 lbs. per acre, being a typical rate of application suitable in most instances. For general use as weed killers, these agents have to be applied at rates between 15 and 25 kilograms per hectare.

The free beta-naphthoxyacetic acid and derivatives thereof other than the esters are without practical effect on chamomile plants. The useful amounts of the naphthoxyacetic acid esters of the invention are free of harmful effects on the crop plants. Three kilograms per hectare of the methyl or ethyl esters of beta-naphthoxyacetic acid are more effective than a mixture of 960 grams MCPA and 288 grams TBA, a commonly employed herbicidal agent, and are much better tolerated by the crop. The human toxicity of the herbicidal agents of the invention to cereal crops is of the same order of magnitude as that of such herbicides as 2,4-dichlorophenoxyacetic acid or MCPA.

The herbicidal effects of the beta-naphthoxyacetic acid esters against chamomile plants and their lack of toxicity for cereal crops will be evident from the following examples which are illustrative but not restrictive of the invention.

Example I

In a greenhouse experiment, wild chamomile plants, *Matricaria chamomilla*, in the medium rosetta stage were respectively sprayed with aqueous dispersions of methyl beta-naphthoxyacetate and of a mixture of MCPA and TBA. Both dispersions were applied at a rate of 1,000 liters per hectare, and respectively contained per 1,000 liters 3 kilograms of the naphthoxyacetic acid ester or 0.96 kilogram MCPA together with 0.288 kilogram TBA. After three weeks, the plants sprayed with methyl beta-naphthoxyacetate were 100 percent destroyed. Only 24 percent of the plants treated with MCPA and TBA were killed.

Example II

To determine the tolerance of cereal crops for the herbicidal agents of the invention, plants of oats, summer barley, summer rye, and summer wheat were sprayed in the greenhouse with methyl beta-naphthoxyacetate in amounts 100% and 300% higher than necessary to destroy chamomile plants. The herbicidal agent was applied in aqueous disperson at a rate of 1,000 liters per hectare. Its effect on the growth of the crop was determined by cutting the plants at the soil surface ten days after the treatment and then weighing the freshly cut plants. The weights tabulated herein are given as averages used in treatment of these plants.

| Methyl beta-naphthoxyacetate, kilogram per hectare | Fresh weight in grams per plant | | | |
|---|---|---|---|---|
| | Barley | Oats | Rye | Wheat |
| 6 | 0.54 | 0.36 | 0.45 | 0.33 |
| 12 | 0.51 | 0.35 | 0.49 | 0.34 |
| 0 | 0.46 | 0.33 | 0.46 | 0.30 |

Example III

Plans of Matricaria sp. were grown in the greenhouse to the medium rosetta stage, and then sprayed with aqueous dispersions of different herbicidal agents of the invention at the rate of 1,000 liters of dispersion per hectare, the dispersion containing three kilograms of the active agent per 1,000 liters. The agents employed were the hexyl, methoxyethyl, and butoxyethyl esters. After four weeks, all treated plants had died.

Example IV

The phytotoxicity of several herbicidal agents to *Matricaria chamomilla* was tested by spraying the plants with aqueous dispersions of the agents at a rate of 1,000 liters per hectare. The percentage of plants killed and the average weight of the treated plants were determined after three weeks. The test was performed in the greenhouse.

| Herbicidal agent | Kilogram/ hectare | Plants killed, percent | Plant weight, grams/ plant |
|---|---|---|---|
| Methyl beta-naphthoxyacetate | 3 | 67 | 2.14 |
| Hexyl beta-naphthoxyacetate | 3 | 80 | 1.92 |
| Beta-naphthoxyacetic acid | 30 | 13 | 4.32 |
| Beta-naphthoxyacetamide | 30 | 20 | 3.86 |
| Beta-naphthoxyacetonitrile | 30 | 13 | 3.90 |
| Sodium 2,4-dichlorophenoxyacetate | 1 | 0 | 5.67 |
| Hexyl 2,4-dichlorophenoxyacetate | 0.25 | 0 | 5.84 |
| Hexyl 2,4-dichlorophenoxyacetate | 0.50 | 0 | 5.35 |
| None | | 0 | 7.34 |

The esters of beta-naphthoxyacetic acid are more effective against wild chamomile plants than the tenfold amount of the free acid, its amide, or its nitrile. While the esters of the known phenoxyacetic acids are less effective than the two- or fourfold amount of the corresponding free acids or its salts.

Example IV shows that the methyl and hexyl esters of beta-naphthoxyacetic acid have closely similar herbicidal effects on chamomile plants. The ethyl, propyl, butyl, pentyl esters are equally effective, and so are the methoxyethyl, ethoxyethyl, propoxyethyl, and butoxyethyl esters. No significant differences have been found between esters of alcohols having straight chains and those having branched chains nor between the primary and secondary alcohols having up to six carbon atoms.

The herbicidal agents of the invention are effective in such small amounts that they are best employed with inert carriers. Water is the preferred vehicle or carrier, and was employed in the illustrative examples. The aqueous carrier should include a dispersing agent or emulsifier. The esters of the invention are adequately soluble in many organic solvents including benzene, xylene, methylene chloride, ethylene chloride, chloroform, and tetrahydrofurane, and may be applied in the form of solutions in such organic solvents. They may be combined with solid inert carriers such as attaclay, kaolin, or talcum, the term inert carrier in this context designating any diluent which in itself has no significant herbicidal effects on chamomile plants. Wetting agents, emulsifiers, and dispersing agents will preferably be incorporated in the inert carriers as is conventional, and the herbicidal compositions essentially consisting of one or several esters of this invention and a carrier may further contain minor amounts of such known adjuvants as binders and stabilizers.

The herbicidal compositions of the invention may be combined with other weed killers or they may be admixed to fertilizer compositions to facilitate their application as is well known to those skilled in the art.

Other variations and modifications of the invention will readily suggest themselves to those skilled in the art, and it will be understood that the invention is not limited to the embodiments thereof chosen for the purpose of the disclosure, but is to be construed broadly within the scope of the appended claims.

We claim:

1. A method of selectively destroying chamomile plants in crops which comprises treating said crops and said chamomile plants with an amount of a composition containing as the active constituent an ester of beta-naphthoxyacetate acid having the formula

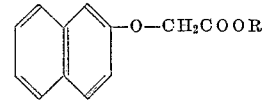

wherein R is a member of the group consisting of alkyl having from one to six carbon atoms, and alkoxyethyl, the alkoxy group of said alkoxyethyl having from one to four carbon atoms, the amount of said composition being sufficient substantially to destroy said chamomile plants, but smaller than the amount of said composition necessary for damaging said crops.

2. A method as set forth in claim 1, wherein said ester is the methyl ester of beta-naphthoxyacetic ester.

3. A method as set forth in claim 1, wherein said ester is applied at a rate of one to five kilograms per hectare.

4. A method as set forth in claim 3, wherein said ester is dispersed in an aqueous carrier.

5. A method as set forth in claim 4, wherein said ester is the methyl ester of beta-naphthoxyacetic acid.

6. A method as set forth in claim 1, wherein said chamomile plants are in the rosetta stage.

7. A method as set forth in claim 1, wherein said crops are cereal crops.

8. A method as set forth in claim 1, wherein said crops are cereal crops, and said ester is applied at a rate of one to five kilograms per hectare.

9. A method as set forth in claim 8, wherein said ester is the methyl ester of beta-naphthoxyacetic acid.

10. A method as set forth in claim 9, wherein said chamomile plants are in the rosetta stage.

11. A method as set forth in claim 8, wherein said chamomile plants are in the rosetta stage.

12. A method as set forth in claim 1, wherein R is alkoxyethyl having not more than four carbon atoms in the alkoxy group thereof.

References Cited by the Examiner

UNITED STATES PATENTS 2,396,513   3/46   Jones _____ 71—2.6
2,577,969   12/51  Jones _____ 71—2.6

FOREIGN PATENTS 591,744   8/47   Great Britain.

LEWIS GOTTS, *Primary Examiner.*

JULIAN S. LEVITT, *Examiner.*